US008585371B2

(12) United States Patent
Hugues

(10) Patent No.: US 8,585,371 B2
(45) Date of Patent: Nov. 19, 2013

(54) WINGTIP DEVICE FOR THE TIP OF A WING, BLADE OF A WIND GENERATOR OR MARINE GENERATOR FOR REDUCING OR EVEN ELIMINATING MARGINAL SWIRL

(76) Inventor: Christian Hugues, Vitry sur Seine (FR)

( * ) Notice: Subject to any disclaimer, the term of this patent is extended or adjusted under 35 U.S.C. 154(b) by 454 days.

(21) Appl. No.: 12/991,460

(22) PCT Filed: May 12, 2009

(86) PCT No.: PCT/FR2009/000547
§ 371 (c)(1),
(2), (4) Date: Nov. 8, 2010

(87) PCT Pub. No.: WO2009/141536
PCT Pub. Date: Nov. 26, 2009

(65) Prior Publication Data
US 2011/0070090 A1    Mar. 24, 2011

(30) Foreign Application Priority Data
May 14, 2008   (FR) ..................................... 08 02599

(51) Int. Cl.
*B64C 23/06*   (2006.01)
(52) U.S. Cl.
USPC ....................................... 416/228; 416/231 B
(58) Field of Classification Search
USPC ............... 416/223 R, 228, 231 R, 231 B, 238
See application file for complete search history.

(56) References Cited

U.S. PATENT DOCUMENTS

| 3,974,986 A | 8/1976 | Johnstone |
| 4,478,380 A | 10/1984 | Frakes |
| 6,892,988 B2 | 5/2005 | Hugues |
| 7,207,526 B2 * | 4/2007 | McCarthy .................. 244/199.4 |
| 8,162,613 B2 * | 4/2012 | Oleson et al. ............. 416/210 R |
| 2004/0195461 A1 * | 10/2004 | Hugues .......................... 244/199 |

FOREIGN PATENT DOCUMENTS

| FR | 2 823 541 A1 | 10/2002 |
| WO | 02/083497 A1 | 10/2002 |

OTHER PUBLICATIONS

International Search Report, dated Oct. 15, 2009, from corresponding PCT application.

* cited by examiner

*Primary Examiner* — Edward Look
*Assistant Examiner* — Juan G Flores
(74) *Attorney, Agent, or Firm* — Young & Thompson

(57) ABSTRACT

A wing-tip device for the tip of a wing, or a blade of a wind generator, or a blade of a marine generator that makes it possible to reduce or even cancel what are known as wing-tip vortices. In the case or a wind generator, the result provides a start-up with less wind, control and energy efficiency that are highly productive throughout its use while at the same time significantly reducing the noise caused by the vortex.

3 Claims, 3 Drawing Sheets

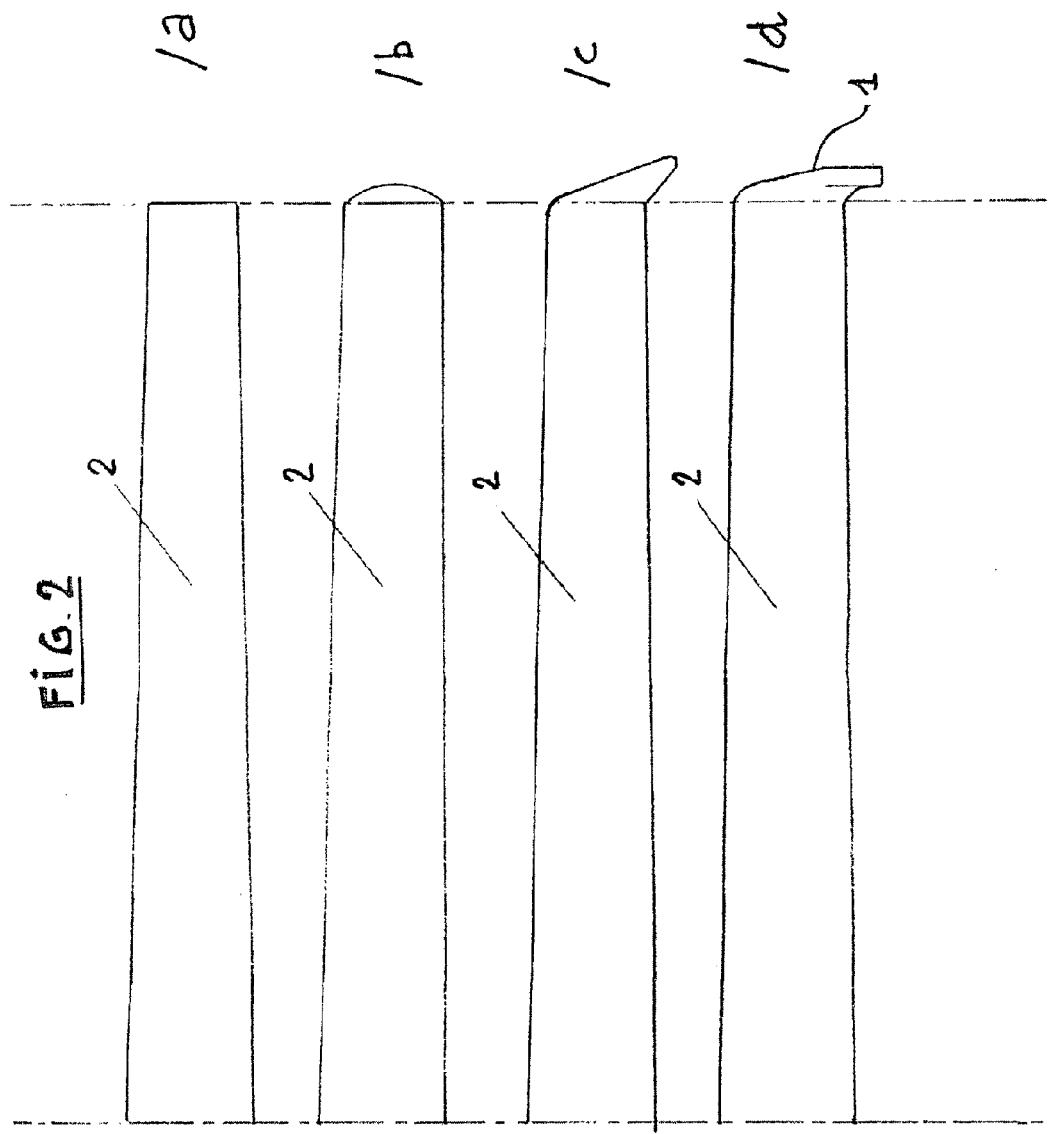

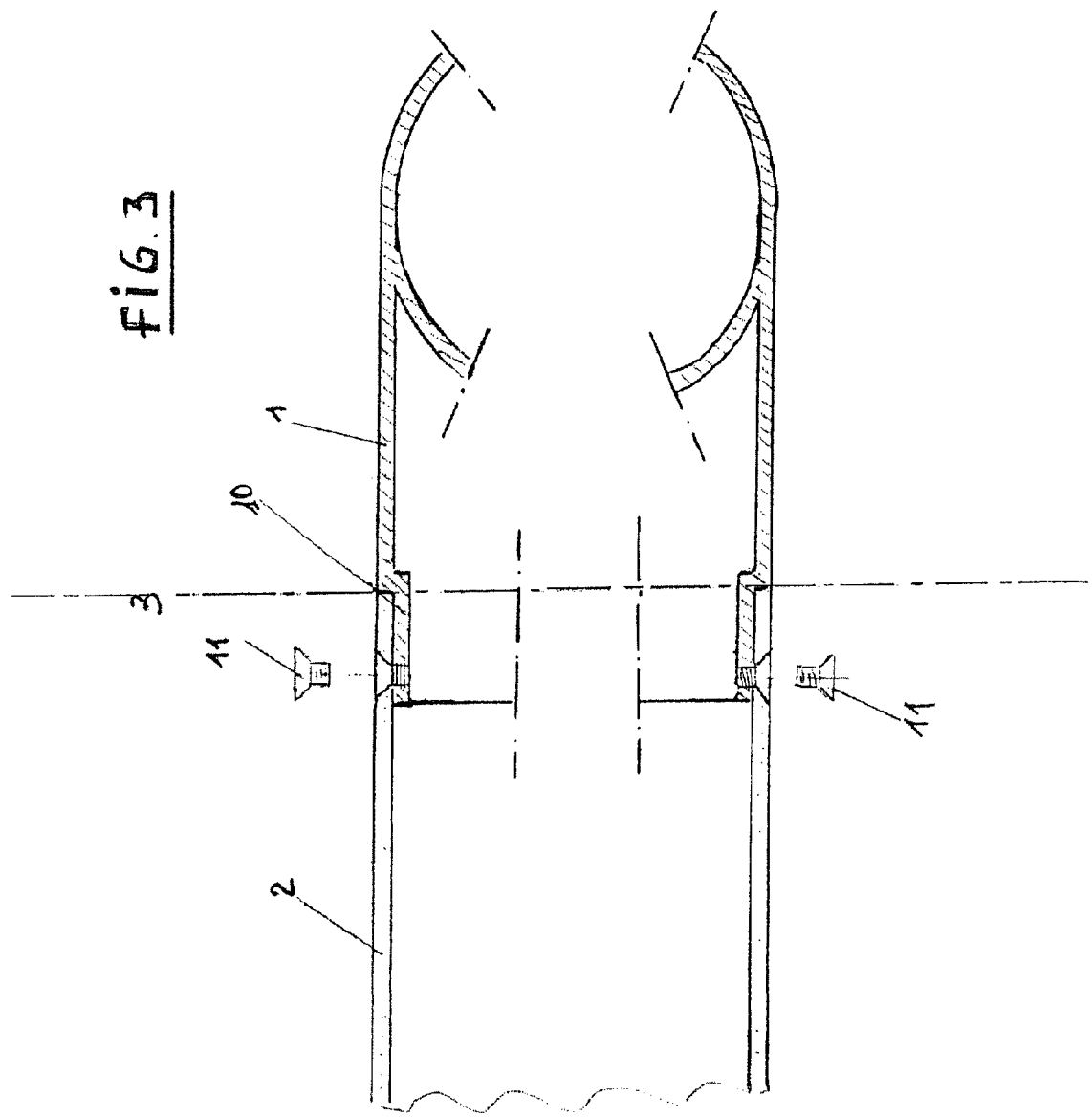

Figure 1:
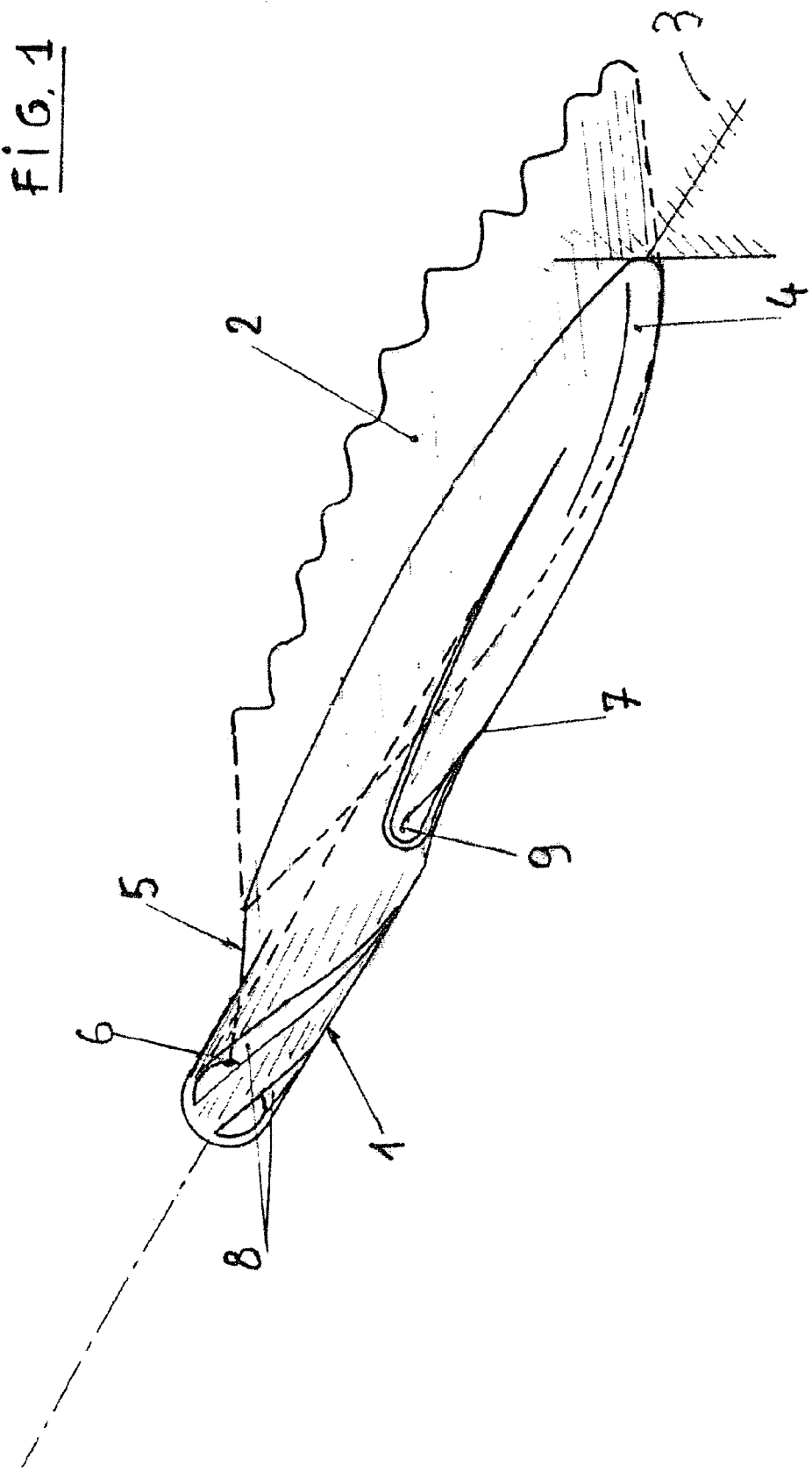

WINGTIP DEVICE FOR THE TIP OF A WING, BLADE OF A WIND GENERATOR OR MARINE GENERATOR FOR REDUCING OR EVEN ELIMINATING MARGINAL SWIRL

The previous French patent national patent register No. 0104998 publication No. FR2823541, PCT No. WO 02/083497 A1, and U.S. Pat. No. 0,195,461 A1 of the applicant described a wingtip device or more generally a device having an undersurface and upper surface and the purpose of said device being to increase lift, reduce induced drag and above all eliminate marginal swirl said vortex an extremely dangerous phenomenon in the air traffic context.

The above-mentioned patent explains that this device could be applied to the wings of aircraft and blades of all sorts including driven propellers such as the blades of wind or marine generators thus making it possible to produce more energy.

This vortex effect behaves in a manner regarded as dangerous and noisy known for its vorticity acting on the full extent of the wingtip or blade where in the latter case, the intensity of the vortex effect is linked to speed and angle of attack in relation to the fluid in which the wing or blade is moving.

Adaptation of the device described in the initial patent has already made it possible to obtain in the case of a standard wind generator an increase in energy performance of about 14% for a wind speed of 10 m/s with correlative attenuation of noise however the increase in the performance targeted in particular in view of the substantial increase in the number of wind generators worldwide, requires more efficient adaptation of this device in order to further increase energy efficiency, this takes us into the context of this invention.

It has been observed that on the approach to compressible speeds the device described in the previous patent created a weak commencement of vorticity at the tip near the leading edge and the overpressure, created by the undersurface which is more virulent, extended beyond the inlet to the cylinder and tended towards the upper surface and was thus driven towards the trailing edge.

The difference on the tip chord towards the trailing edge, creates a negative pressure which increases in proportion to this speed.

The combination of these two air flows which meet on the trailing edge, immediately creates a mini-vortex situated close to the cylinder and the helicoidal slot situated at this point at this speed, only accentuates the creation of this mini-vortex.

In other words and examining FIGS. 2 and 3 of this initial patent, the angles formed by leading edge (1) ovoid bevel (15) of wingtip cylinder (22) and the resultant angles of trailing edge (2) and cylinder walls (22), are slightly perturbatory when the point of compression is reached in proportion to flow speed and the curves proposed at this point by the present invention will reduce or even cancel these perturbation effects due to the COANDA effect thus obtained.

In more precise terms and insofar as wind generators are concerned in general whether two-bladed or three-bladed, and equipped with vertical or horizontal rotors, performance parameters depend essentially for example for a diameter of the order of 45 m, on wind speed in this respect we can observe here, that the power produced between 5 m/s and 15 m/s, is of the order of 8 KW to 650 KW bearing in mind that this diameter is not restrictive and can go as high at the present time as 80 m for a power output of 2,500 KW and 126 m for a power output of 6,000 KW, naturally using automatic stalling systems operating in the event of an excessive increase in wind speed.

This invention is aimed at wind or even marine generators but not exclusively, as the proposed device also applies to the wings of aircraft or any other profiles having a leading edge and trailing edge moving in a liquid or gaseous fluid which by the above-mentioned COANDA effect obtained in addition to the effect of the device itself according to the invention and located at the wingtip eliminates almost all the vortex.

FIG. 1 according to the description, provides a perspective view of the device according to the invention identified as (1) for its entirety and the device being fixed to the wingtip or blade (2) at interface (3) and the leading edge of said device (4) is curved so as to terminate at the middle of the cylinder at point (7) and trailing edge (5) of said device also curved, terminates at point (6) corresponding to the radial half of this cylindrical part of said device also presenting in addition, a new aesthetic adaptation at the wingtip or blade tip.

The cylindrical part which is hollow, can include one or more helicoidal slots (8) and a profiled longitudinal opening (9) debouching to coincide with the decrease at point (7) of profile (4) of the leading edge.

According to the previous device and when we approach compressible speeds, a commencement of vorticity was created close to the leading edge and the more virulent overpressure effect created by the under surface extended beyond the inlet of the cylinder and tended towards the upper surface then being driven towards the trailing edge.

The combination of these two flows which then met at the trailing edge, instantaneously created a mini-vortex situated close to the cylinder at the same level.

To sum up and in accordance with the new device in accordance with the invention, the curve of leading edge (4) terminating at point (7), produces a COANDA effect at ram air which then penetrates the cylindrical part via inlet (9) and the curvature of trailing edge end (5) terminating at point (6) also produces a COANDA effect while the undersurface overpressures penetrate the cylindrical part via helicoidal slot or slots (8) for ejection to the exterior.

As regards attachment of the device to the wing or blade, it should first be noted that both are hollow and it is consequently possible to incorporate this device inside the wing or blade without difficulty attaching the device by simple well-known means.

The figure shows the various forms that wing or blade tips can have:
a) clean tip
b) tip with tip fairing
c) tip with winglet In the two latter cases, the tip is cleaned by removing said tips fairing or winglets or by cutting and fitting the device in accordance with the invention, this can be done in various ways, presents no problem hence:
d) tip equipped with device (1) in accordance with the invention.

FIG. 3 shows in addition, another simple method of attachment among others by planning on the device in accordance with the invention, an internal indentation providing for fitting with the hollow wing or blade (2) in accordance with interface (3) and attachment to the device according to the invention by bonding, or using screws (11), thus providing for secure installation and eventual disassembly of said device for example for maintenance purposes.

In conclusion, almost all swirl said vortex is eliminated by application of this device which can be used with all types of wing profiles or blade whether wind or marine generator or indeed helicopters and by extension with all profiles situated in a liquid or gaseous fluid such among others as rudder blade or stabilisers for ships, submarine horizontal and vertical rudders, submerged tidal generator profiles, or front and rear stabilisers for Formula 1 racing cars or other vehicles.

KEY TO DRAWINGS AND FIGURES

1—Device
2—Wing or blade
3—Interface
4—Leading edge
5—Trailing edge
6—Trailing edge end
7—Leading edge end
8—Helicoidal slot(s)
9—Cylinder form inlet
10—Indentation
11—Screw

The invention claimed is:

1. A device (1) for being fixed to an interface (3) of a wingtip or blade of a wind or marine generator, the device serving to reduce or eliminate marginal swirl, said device comprising:
   a streamlined body with a side adapted for securing to a tip of a wing or blade (2) at an interface (3) thereof;
   a generally cylindrical hollow part merging with the streamlined body on another side thereof and defining a cylindrical channel having an ovoid inlet (9) with an upstream beveled portion;
   the streamlined body having a leading edge protruding into the upstream beveled portion of the ovoid inlet, the leading edge being shaped to induce a COANDA effect at the ovoid inlet, the leading edge terminating at a point (7) substantially coinciding with a downstream end of the beveled portion of the ovoid inlet (9); and
   at least one helicoidal slot (8) in said cylindrical hollow part allowing ejection of fluid toward an exterior of said cylindrical hollow part.

2. The device in accordance with claim 1, further comprising an internal indentation towards an interior (10) of said device (1), the internal indentation being adapted for attaching said device on the tip of the wing or the blade at the interface (3).

3. The device in accordance with claim 1, wherein said streamlined body further comprises a trailing edge (5) that is outside and adjacent to said hollow part and that is curved to induce a COANDA effect.

* * * * *